United States Patent
Shin et al.

(10) Patent No.: US 9,905,024 B2
(45) Date of Patent: Feb. 27, 2018

(54) OBJECT RECOGNITION DEVICE, VEHICLE HAVING THE SAME AND METHOD OF CONTROLLING THE SAME

(71) Applicant: Hyundai Motor Company, Seoul (KR)

(72) Inventors: Kicheol Shin, Gyeonggi-do (KR); MyungSeon Heo, Seoul (KR); Youngchul Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 250 days.

(21) Appl. No.: 14/957,061

(22) Filed: Dec. 2, 2015

(65) Prior Publication Data

US 2017/0061219 A1 Mar. 2, 2017

(30) Foreign Application Priority Data

Aug. 28, 2015 (KR) .......................... 10-2015-0121666

(51) Int. Cl.
*G06K 9/00* (2006.01)
*G06T 7/60* (2017.01)
*G06K 9/62* (2006.01)

(52) U.S. Cl.
CPC ............ *G06T 7/60* (2013.01); *G06K 9/00805* (2013.01); *G06K 9/6293* (2013.01)

(58) Field of Classification Search
CPC .... G06T 7/60; G06K 9/00805; G06K 9/6293; G06K 9/4604
USPC ........................................................ 382/104
See application file for complete search history.

(56) References Cited

U.S. PATENT DOCUMENTS

| | | |
|---|---|---|
| 2004/0178945 A1 | 9/2004 | Buchanan |
| 2008/0266167 A1 | 10/2008 | Baumann et al. |
| 2009/0073258 A1 | 3/2009 | Robert et al. |
| 2015/0199806 A1* | 7/2015 | Tseng ..................... G06T 7/004 382/104 |

(Continued)

FOREIGN PATENT DOCUMENTS

| | | |
|---|---|---|
| JP | H1144533 A | 2/1999 |
| JP | 2006-517659 A | 7/2006 |

(Continued)

OTHER PUBLICATIONS

Notice of Allowance for Korean Patent Application No. 10-2015-0121666 from the Korean Intellectual Property Office, dated Aug. 29, 2017, English Abstract, 1 page.

*Primary Examiner* — Van D Huynh
(74) *Attorney, Agent, or Firm* — Mintz Levin Cohn Ferris Glovsky and Popeo, P.C.; Peter F. Corless

(57) ABSTRACT

An object recognition device includes: a storage unit that stores image information corresponding to respective shapes of a plurality of objects, and a control unit that groups a plurality of signals detected by a distance detection unit to acquire position information of at least one of the plurality of objects, sets a first object of the plurality of objects based on the acquired position information, sets an interference area based on position information of the first object, acquires position information and image information of a second object of the plurality of objects located in the interference area, and corrects the acquired position information of the second object based on the image information of the second object and the image information stored in the storage unit.

25 Claims, 15 Drawing Sheets

(56) References Cited

U.S. PATENT DOCUMENTS

| | | | | |
|---|---|---|---|---|
| 2016/0187147 A1* | 6/2016 | Kang | ................. | G01C 21/26 |
| | | | | 701/468 |
| 2016/0341557 A1* | 11/2016 | Kondo | ................. | G01C 21/28 |
| 2017/0140230 A1* | 5/2017 | Yoshida | ............ | G06K 9/00805 |
| 2017/0184407 A1* | 6/2017 | Yamashiro | ............ | G01C 21/28 |
| 2017/0227970 A1* | 8/2017 | Taguchi | ............... | G05D 1/0276 |

FOREIGN PATENT DOCUMENTS

| | | | |
|---|---|---|---|
| JP | 2009-231937 A | 10/2009 |
| JP | 5396475 B2 | 1/2014 |
| JP | 2015-079368 A | 4/2015 |
| KR | 2012-0072131 A | 7/2012 |

\* cited by examiner

OBJECT RECOGNITION DEVICE, VEHICLE HAVING THE SAME AND METHOD OF CONTROLLING THE SAME

CROSS-REFERENCE TO RELATED APPLICATION

This application claims the benefit of and priority to Korean Patent Application No. 10-2015-0121666, filed on Aug. 28, 2015 in the Korean Intellectual Property Office, wherein the disclosure of which is incorporated herein by reference.

BACKGROUND

1. Technical Field

The present disclosure relates generally to object recognition and vehicular technologies and, more particularly, to an object recognition device for recognizing surrounding objects, a vehicle having the same and a method of controlling the same.

2. Description of the Related Art

So-called "intelligent" typically include at least one of an ultrasonic sensor, an image sensor, a laser sensor, and a LiDAR sensor used as a substitute for vision of a person. Intelligent vehicles include autonomous traveling vehicles that automatically travel without requiring an operation of a driver while collecting travel-related information using sensors to recognize objects such as obstacles in front of the vehicle. Thus, even when a driver cannot accurately recognize a road environment due to, e.g., carelessness, negligence, and a limited field of vision, the intelligent vehicle assists the driver in recognizing the road environment to prevent accidents from occurring.

When an intelligent vehicle recognizes an object using an image sensor of the vehicle, there can be a problem in which the vehicle may erroneously recognize shadows as the vehicle. Similarly, an incorrect warning can occur due to direct sunlight, objects reflecting light, a rear strong light source, or a low illuminance environment.

When the intelligent vehicle recognizes an object using a distance sensor such as an ultrasonic sensor, the intelligent vehicle can determine whether or not there is an obstacle or determine a shape of the obstacle. However, object recognition is limited due to objects in front of the intelligent vehicle being covered, and there can be a problem in that accuracy of recognition of an object such as road signs, ramps, and speed bumps is low. For example, ramps or speed bumps are often recognized as obstacles.

When the intelligent vehicle recognizes an object using a LiDAR sensor, a radar sensor, or the like, there can be a problem in that the vehicle cannot recognize roads or facilities 200 meters or more in front of the vehicle. Thus, safe driving cannot be ensured in unexpected situations such as a road with without lane lines, a road with potholes, or bad weather.

Further, when the intelligent vehicle recognizes an object using a LiDAR sensor, a radar sensor, or the like, there can be difficulty in identifying a recognized object. Thus, there is a problem in that preceding vehicles can interfere with a field of vision of the LiDAR sensor, particularly when roads are congested, and a shape and a position of a vehicle before the preceding vehicles are not accurately recognized. For example, the intelligent vehicle has a problem in that a vehicle located at 100 meters in front of the own vehicle obstructs the visibility of the LiDAR sensor of the own vehicle, causing the vehicle not to recognize a shape and a position of a vehicle located at 200 meters in front of the own vehicle.

SUMMARY

An aspect of the present disclosure provides an object recognition device that corrects information of an object detected by a LiDAR sensor based on information of an object detected by a camera, a vehicle having the same and a method of controlling the same. Another aspect of the present disclosure provides an object recognition device that detects an image of surroundings and learns shape information of an object, a vehicle having the same and a method of controlling the same.

An object recognition device according to embodiments of the present disclosure includes: a storage unit that stores image information corresponding to respective shapes of a plurality of objects; and a control unit that groups a plurality of signals detected by a distance detection unit to acquire position information of at least one of the plurality of objects, sets a first object of the plurality of objects based on the acquired position information, sets an interference area based on position information of the first object, acquires position information and image information of a second object of the plurality of objects located in the interference area, and corrects the acquired position information of the second object based on the image information of the second object and the image information stored in the storage unit.

The control unit of the object recognition device may acquire image information of the at least one object based on an image signal detected by an image detection unit, determine the shape of the at least one object based on the acquired image information, and control storage of image information of the at least one object.

The control unit of the object recognition device may group the plurality of signals to acquire shape information of the second object, and correct the acquired shape information of the second object based on the image information of the second object and the image information stored in the storage unit.

Furthermore, according to embodiments of the present disclosure, a vehicle includes: a body; a distance detection unit that is provided in the body and detects a distance from the vehicle to a surrounding object; an image detection unit that is provided in the body and detects an image of the surrounding object; a storage unit that stores image information corresponding to respective shapes of a plurality of objects; and an object recognition device that groups a plurality of signals detected by the distance detection unit to acquire position information of at least one of the plurality of objects, sets a vehicle closest to the body as a first vehicle based on the acquired position information, sets an interference area based on position information of the first vehicle, acquires position information and image information of a second vehicle located in the interference area, and corrects the acquired position information of the second vehicle based on the image information of the second vehicle and the image information stored in the storage unit.

The object recognition device may acquire image information of the at least one object based on an image signal detected by an image detection unit, determine the shape of the at least one object based on the acquired image information, and control storage of image information of the at least one object.

The object recognition device may acquire shape information of the second vehicle based on a grouping of the plurality of signals and correct the acquired shape information of the second object based on the image information of the second vehicle and the image information stored in the storage unit.

The object recognition device may determine image information matching the image information of the second vehicle among the image information stored in the storage unit, acquire image information of an undetected portion not detected by the distance detection unit based on the determined image information, and correct the shape information of the second vehicle based on the acquired image information of the undetected portion.

The vehicle may further include: an electronic control unit that controls driving of a driving device of the vehicle based on the shape information and the position information of the first vehicle and the corrected position information and the corrected shape information of the second vehicle in an autonomous traveling mode.

The vehicle may further include: a communication unit that receives a current position of the vehicle. The electronic control unit may control driving of the driving device based on the current position.

The object recognition device may set a preceding vehicle traveling in the same lane as the vehicle and located closest to the vehicle as the first vehicle.

The object recognition device may set a preceding vehicle traveling in a lane to the left or right of a lane in which the vehicle is located and located closest to the vehicle as the first vehicle.

The distance detection unit may include at least one LiDAR sensor, and the image detection unit may include at least one image sensor.

The object recognition device may set, as the interference area, an area within a first fixed distance to the left from a left end point in the position information of the first vehicle, a second fixed distance to the right from a right end point, and a third fixed distance forward from the left and right endpoints.

The object recognition device may set an area having a preset size as the interference area based on the position information of the first vehicle.

Furthermore, according to embodiments of the present disclosure, a vehicle includes: a body; a distance detection unit that is provided in the body and detects a distance from the vehicle to a surrounding object; an image detection unit that is provided in the body and detects an image of the surrounding object; a storage unit that stores image information corresponding to respective shapes of a plurality of objects; and an object recognition device that groups a plurality of signals detected by the distance detection unit to acquire shape information and position information of at least one of the plurality of objects and corrects the acquired shape information and the acquired position information based on image information of the at least one object and the image information stored in the storage unit.

The object recognition device may determine the shape of the at least one object based on the image information of the at least one object and control storage of the image information of the at least one object.

The detection unit of the vehicle may include at least one LiDAR sensor, and the image detection unit may include at least one image sensor.

The object recognition device may determine the object located closest to the distance detection unit and corrects information of the object located in an interference area having a preset size based on the determined object.

The object recognition device may determine image information matching the image information of the object in the interference area among the image information stored in the storage unit, acquire image information of an undetected portion not detected by the distance detection unit based on the determined image information, and correct shape information and position information of the object in the interference area based on the acquired image information of the undetected portion.

Furthermore, according to embodiments of the present disclosure, a method of controlling a vehicle includes: detecting a distance from the vehicle to a surrounding object using a distance detection unit provided in a body of the vehicle; grouping a plurality of signals detected by the distance detection unit to acquire position information of at least one object; setting the vehicle closest to the vehicle as a first vehicle based on the acquired position information of the at least one object; setting an interference area based on position information of the first vehicle; acquiring position information and image information of a second vehicle located in the interference area; correcting the acquired position information of the second vehicle based on the image information of the second vehicle and image information stored in a storage unit; and controlling driving of the vehicle based on the corrected position information of the second vehicle.

The method of controlling a vehicle may further include: detecting an image signal of surroundings of the vehicle using an image detection unit; acquiring image information of the at least one object based on the image signal; determining a shape of the at least one object based on the acquired image information; and storing the image information of the at least one object.

The method of controlling a vehicle may further include: acquiring shape information of the second vehicle based on a grouping of the plurality of signals, and correcting the acquired shape information of the second vehicle based on the image information of the second vehicle and the image information stored in the storage unit.

The correcting of the shape of the second vehicle may include: determining image information matching the image information of the second vehicle among the image information stored in the storage unit; acquiring image information of an undetected portion not detected by the distance detection unit based on the determined image information; and correcting the shape information of the second vehicle based on the acquired image information of the undetected portion.

The first vehicle may precede the vehicle and travel in a lane located closest to the vehicle.

The setting of the interference area may include setting, as an interference area, an area within a first fixed distance to the left from a left end point in the position information of the first vehicle, a second fixed distance to the right from a right end point, and a third fixed distance forward from the left and right endpoints.

According to the present disclosure, it is possible to increase accuracy of the shape and the position of the object by correcting the shape and the position of the detected object using the distance information detected by the distance detection unit and the image information detected by the image detection unit. Accordingly, even when a sensing field of vision of the distance detection unit is covered by vehicles located adjacent to the own vehicle in a congestion section of a road, a shape or a position of a vehicle located in a long distance from the own vehicle can be accurately recognized and, accordingly, a behavior and a traveling trajectory of surrounding vehicles can be recognized more accurately.

By the vehicle traveling autonomously based on the recognized position of the obstacle, it is possible to reduce possibility of accidental contact with the obstacle and improve safety of the vehicle. Thus, according to the present disclosure, it is possible to improve quality and marketability of the vehicle with an object recognition function and an autonomous traveling function, improve user's satisfaction, improve convenience for a user and safety of the vehicle, and ensure competitiveness of products.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF THE EMBODIMENTS

Figure 1:
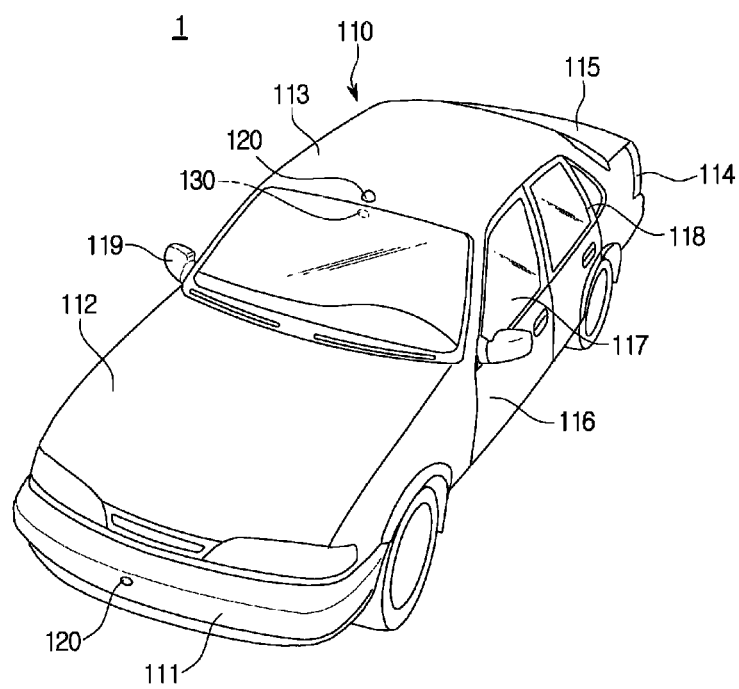
FIG. 1 is a diagram illustrating an appearance of a vehicle according to embodiments of the present disclosure.

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Figure 2:
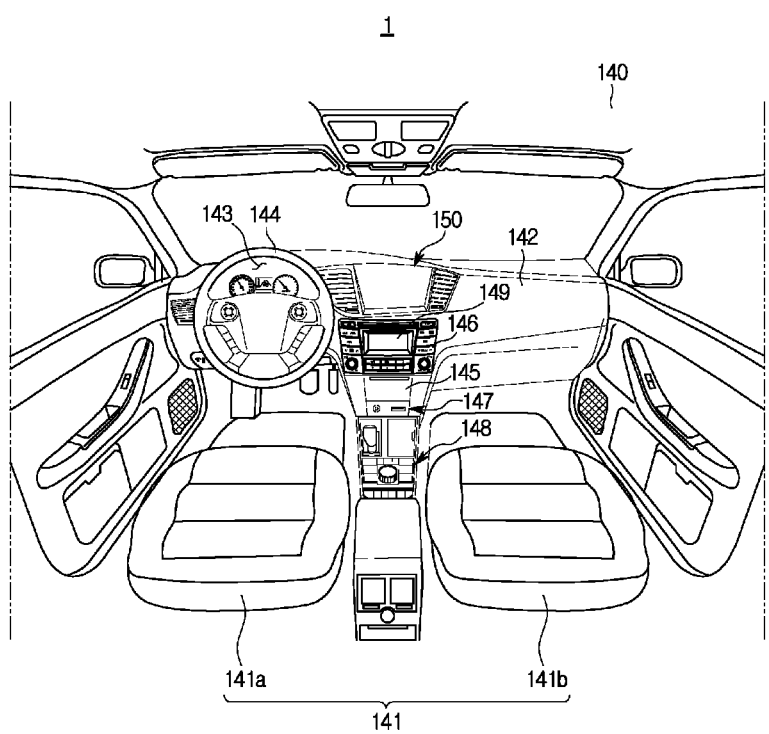
FIG. 2 is a diagram illustrating the inside of the vehicle according to embodiments of the present disclosure.

FIG. 1 is a diagram illustrating an appearance of a vehicle according to embodiments of the present disclosure, and FIG. 2 is a diagram illustrating the inside of the vehicle according to embodiments of the present disclosure.

A vehicle 1 includes a body having an interior and an exterior, and a chassis which is a portion other than the body and in which mechanical devices necessary for traveling are installed.

As illustrated in FIG. 1, an exterior 110 of the body includes a front panel 111, a bonnet 112, a roof panel 113, a rear panel 114, a trunk 115, front, rear, left, and right doors 116, and window glasses 117 provided in the front, rear, left, and right doors 116 to be openable and closable.

The exterior of the body further includes fillers 118 provided at boundaries between the front panel, the bonnet, the roof panel, the rear panel, the trunk, and the window glasses of the front, rear, left, and right doors, and side mirrors 119 that provides a rearward field of vision of the vehicle 1 to the driver.

The vehicle 1 may further include detection devices, such as a distance detection unit that detects distances to surrounding objects in forward, backward, left, and right directions, an image detection unit that detects images of surroundings in the forward, backward, left, and right directions, a rain detection unit that determines whether or not it rains and detects precipitation, a wheel speed detection unit that detects speeds of front, rear, left, and right wheels, an acceleration detection unit that detects an acceleration of the vehicle, and an angular velocity detection unit that detects a steering angle of the vehicle.

Here, the distance detection unit 120 may include a radar sensor or a Light Detection And Ranging (LiDAR) sensor.

This distance detection unit 120 may be provided in at least one of the front panel 111 and the roof panel 113 of the vehicle.

One distance detection unit 120 may be provided at a center of the front panel 111, and three distance detection units 120 may be provided at a left side, a right side, and the center of the front panel 111.

The image detection unit 130 is a camera, and may include a charge-coupled device (CCD) or complementary metal-oxide-semiconductor (CMOS) image sensor.

The image detection unit 130 is provided on a front window glass. The image detection unit 130 may be provided on the window glass inside the vehicle, may be provided in a room mirror inside the vehicle, or may be provided in the roof panel 113 to be exposed to the outside.

As illustrated in FIG. 2, an interior 140 of the body includes seats 141 on which persons sit, a dashboard 142, an instrument panel (that is, a cluster) 143 arranged on the dashboard and including a tachometer, a speedometer, a cooling water thermometer, a fuel gauge, a direction change indicator, a high beam indicator, a warning light, a safety belt warning light, an odometer, a hodometer, an automatic transmission selection lever indicator, a door open warning light, an engine oil warning light, a fuel shortage warning light, and the like arranged therein, a steering wheel 144 that operates a direction of the vehicle, and a center fascia 145 in which an outlet and an adjustment plate of an air conditioner, and an audio device are arranged.

The seats 141 includes a driver seat 141*a* on which a driver sits, a passenger seat 141*b* on which a passenger sits, and rear seats located backward inside the vehicle.

The steering wheel 144 is a device for adjusting a traveling direction of the vehicle 1, and may include a rim gripped by the driver, and a spoke connected to a steering device of the vehicle 1 and connecting the rim to a hub of a rotation shaft for steering.

Further, various devices in the vehicle 1, such as an operating device (not shown) for controlling the audio device or the like, may be provided in the spoke.

A head unit 146 for controlling the audio device, the air conditioner, and a heater, the outlet, a cigar jack, a multi-terminal 147, and the like are installed in the center fascia 145.

Here, the multi-terminal 147 may be arranged at a position adjacent to the head unit 146. The multi-terminal 147 includes universal serial bus (USB) port and an auxiliary (AUX) terminal. The multi-terminal 147 may further include secure digital (SD) slot.

The vehicle 1 may further include an input unit 148 for receiving commands to operate various functions.

The input unit 148 may be provided in the head unit 146 and the center fascia 145. The input unit 148 includes at least one physical button, such as a button for turning ON/OFF various functions or a button for changing set values of the various functions.

This input unit 148 may transfer a button operation signal to the electronic control unit (ECU), a control unit in the head unit 146, or a terminal 150.

The input unit 148 may include a touch panel provided integrally with a display unit of the terminal 150. This input unit 148 may be displayed in an activated button shape on the display unit of the terminal 150. In this case, the input unit 148 receives position information of the displayed button.

The input unit 148 may further include a jog dial (not shown) or a touch pad for inputting a movement command and a selection command for a cursor displayed on the display unit of the terminal 150.

The input unit 148 may transfer an operation signal of the jog dial or a touch signal of the touch pad to the electronic control unit (ECU), a control unit of the head unit 146, or the terminal 150.

Here, the jog dial or the touch pad may be provided in the center fascia or the like.

The input unit 148 may receive a command to turn ON/OFF the terminal 150, receive selection of at least one of a plurality of functions, and transfer a signal for the selected function to the electronic control unit (ECU), the control unit of the head unit 146, or the terminal 150.

More specifically, the input unit 148 may receive any one of a manual driving mode in which the driver directly drives the vehicle and an autonomous traveling mode. When the autonomous traveling mode is input, the input unit 148 transfers an input signal for the autonomous traveling mode to the electronic control unit (ECU).

Further, the input unit 148 receives destination information and transfers the input destination information to the terminal 150 when a navigation function is selected, and receives channel and volume information and transfers the input channel and volume information to the terminal 150 when a DMB function is selected.

The vehicle 1 may further include a display unit 149 that displays information on a function that is being performed and information input by the user.

Further, the vehicle 1 may display the information on a function that is being performed and the information input by the user on the terminal 150.

This terminal 150 may also be installed in a standing manner on the dashboard.

The terminal 150 may perform an audio function, a video function, a navigation function, a DMB function, and a radio function, and may also display images in the forward, backward, left, and right directions in the autonomous traveling mode.

This terminal 150 may output content received from the outside or video and audio information stored in a storage medium, or may perform an audio function of outputting an audio signal transferred from the outside.

The chassis of the vehicle includes, for example, a power generation device, a power transfer device, a traveling device, the steering device, a brake device, a suspension device, a transmission, a fuel device, and front, rear, left, and right wheels.

Further, for the safety of the driver and the passengers, several safety devices may be provided in the vehicle.

The safety devices for a vehicle include several types of safety devices, such as an airbag control device for safety of the passengers such as the driver at the time of vehicle collision, and a vehicle posture electronic stability control (ESC) device that controls a posture of the vehicle at the time of acceleration or cornering of the vehicle.

This vehicle 1 further includes driving devices for applying a driving force and a braking force to the front, rear, left, and right wheels, such as the power generation device, the power transfer device, the traveling device, the steering device, the brake device, the suspension device, the transmission, and the fuel device. The vehicle 1 includes the electronic control unit (ECU) that controls driving of the driving devices, several safety devices, and various detection devices.

The vehicle 1 may further include electronic devices, such as a hands-free device installed for driver's convenience, a global positioning system (GPS) receiver, the audio device, a Bluetooth device, a rear camera, a charging device for a user terminal, and a high-pass device.

This vehicle 1 may further include a start button for inputting an operation command to a starter motor (not shown).

That is, when a start button is turned ON, the vehicle 1 operates the starter motor (not shown), and operates an engine (not shown) that is a power generation device through an operation of the starter motor.

The vehicle 1 further includes a battery (not shown) electrically connected to the terminal, the audio device, interior lights, the starter motor, and other electronic devices so as to supply electrical driving power thereto.

This battery is charged by a self-power generator or power of the engine during traveling.

Further, the vehicle 1 may further include a communication device for communication between various electronic devices inside the vehicle 1 and communication with the user terminal which is an external terminal.

The communication device may include a controller area network (CAN) communication module, a WIFI communication module, a USB communication module, and a Bluetooth communication module.

Further, the communication device may further include a GPS reception module for acquiring position information from a satellite. The communication device may further include TPEG such as DMB, or a broadcast communication module such as SXM or RDS.

Figure 3:
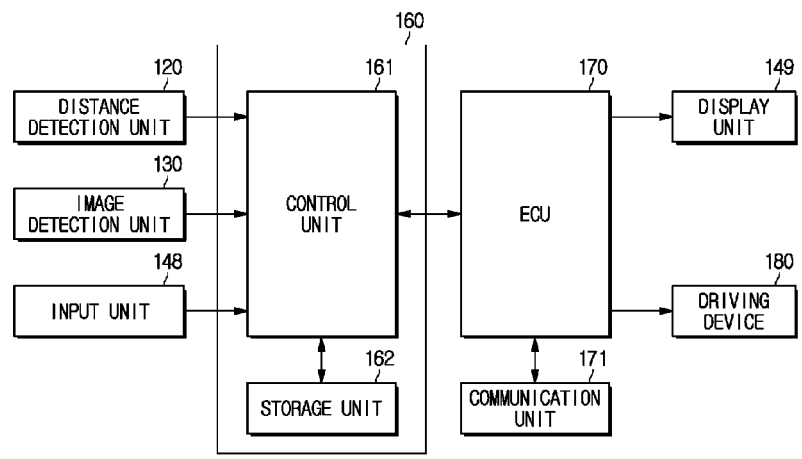
FIG. 3 is a control configuration diagram of the vehicle according to embodiments of the present disclosure.

FIG. 3 is a control configuration diagram of the vehicle according to embodiments of the present disclosure.

The vehicle 1 includes the distance detection unit 120, the image detection unit 130, the input unit 148, the display unit 149, the object recognition unit 160, the electronic control unit (ECU) 170, the communication unit 171, and the driving device 180.

The distance detection unit 120 detects a signal for detecting objects located outside the vehicle, such as a preceding vehicle traveling in front of the vehicle, a stationary object such as a structure installed around a road, a vehicle approaching from an opposite lane, or the like.

That is, the distance detection unit 120 outputs a signal corresponding to detection of an object in front, to the left, or to the right of the own vehicle at a current position of the own vehicle. The distance detection unit 120 transfers a signal corresponding to the distance to the detected object to a control unit 161 of the object recognition device.

This distance detection unit 120 includes a LiDAR sensor.

The Light Detection And Ranging (LiDAR) sensor is a non-contact distance detection sensor using a laser radar principle.

The LiDAR sensor may include a transmission unit that transmits a laser, and a reception unit that receives the laser reflected by a surface of the object present within a sensor range.

Here, the laser may be a single laser pulse.

The distance detection unit 120 may include an ultrasonic sensor or a radar sensor.

The ultrasonic sensor generates ultrasonic waves for a fixed period of time, and then, detects a signal reflected by an object.

The ultrasonic sensor may be used to determine whether or not there is an obstacle such as a pedestrian within a short distance.

The radar sensor is a device that detects a position of an object using reflected waves generated due to radiation of radio waves when signal transmission and signal reception are performed at the same place.

This radar sensor uses a Doppler effect, changes a frequency of transmission radio waves over time, or outputs pulse waves as transmission radio waves in order to prevent difficulty in discriminating between transmitted radio waves and received radio waves due to overlapping of the transmitted radio waves and the received radio waves.

For reference, since the Radio Detecting And Ranging (LiDAR) sensor has higher lateral detection accuracy than the RaDAR sensor, it is possible to increase accuracy of a process of determining whether or not there is a path in front of the vehicle.

The image detection unit 130 is a device that detects object information and converts the object information into an electrical image signal. The image detection unit 130 detects an external environment of the own vehicle at a current position of the own vehicle and, particularly information on a road on which the vehicle travels and objects in front, to the left, and to the right of the own vehicle around the road, and transfers an image signal of the detected object information to the control unit 161 of the object recognition device.

The image detection unit 130 includes a front camera that acquires an image of the front of the vehicle. The image detection unit 130 may include at least one of a left camera and a right camera that acquire images of the left and the right of the vehicle, and a rear camera that acquires an image of the rear of the vehicle.

The input unit 148 may be provided as at least one of a button, a touch panel, and a jog dial, and transfers a signal selected by the user to the control unit 161 of the object recognition device.

The input unit 148 receives a recognition mode in which the object is recognized and at least one function is performed based on the recognized object.

Here, the recognition mode may include at least one of an autonomous traveling mode and a warning mode informing of the recognition of the obstacle.

The input unit 148 may also receive the manual driving mode in which the driver directly drives the vehicle.

The input unit 148 may receive a destination in the autonomous traveling mode.

The display unit 149 may display image information generated during execution of a program, such as image information of various menus, digital broadcasting, or the navigation, under the control of the control unit 161. The display unit 149 may also display external image information of the front of the own vehicle.

The display unit 149 may display information on a current mode that is being performed, or may also display information on the destination.

Here, the destination on the information may include address information, total distance information, total required time information, remaining distance information, remaining time information, and the like.

When a command to perform the object recognition mode is received, the object recognition device 160 activates the distance detection unit 120 and the image detection unit 130, acquires object and shape information based on a plurality of signals transferred from the distance detection unit 120, and acquires position information for each acquired object shape.

Here, the position information for each object shape includes distance information for each object shape.

The object recognition device 160 acquires the image of the object based on the image signal of the image detection unit 130, and corrects shape information and the position information of the object acquired by the distance detection unit based on the acquired image information of the object and pre-stored image information of the object.

This object recognition device 160 includes a control unit 161 and a storage unit 162.

The control unit 161 controls an operation of the distance detection unit 120 installed in the own vehicle so as to scan objects located adjacent to the own vehicle.

That is, the control unit 161 controls a movement of the distance detection unit 120 so that the distance detection unit 120 is rotated at a preset angle, and also controls an operation of the distance detection unit 120 so that the distance detection unit 120 transmits a signal in a preset period. The control unit 161 receives detection signals from the distance detection unit 120, and calculates the distance based on transmission and reception times of the received signals, which is a distance corresponding to the received signal for each rotation angle.

In this case, the received signal for each rotation angle is a signal reflected by the object scanned by the LiDAR sensor, and may be collected as point data at coordinates corresponding to a reflection direction and distance.

When the control unit 161 controls the movement of the distance detection unit, the control unit 161 can also control left and right scanning in a long distance if left and right scanning in a short distance is completed, and can also control the left and right scanning in the short distance if the left and right scanning in the long distance is completed.

In addition, the control unit 161 can also control the distance detection unit so that the distance detection unit rotates to the left and right while performing the short distance scanning and the long distance scanning.

In addition, if the distance detection unit is an ultrasonic sensor, the control unit 161 can detect the distance to the object based on a time difference between a generation time and a detection time of ultrasonic waves.

If the distance detection unit is a radar sensor, the control unit 161 detects reflected waves when radio waves of the radar sensor hit the object and are reflected by the object, to detect the distance to the object.

The control unit 161 collects the collected point data and acquires shape information and position information of the object.

That is, the control unit 161 acquires shape information and position information of the object from the direction, the distance, and the number of points between the own vehicle and the object.

The control unit 161 sets a preceding vehicle at a position most adjacent to the own vehicle among preceding vehicles traveling on the same lane as the own vehicle among the acquired objects based on the acquired position information of the objects, as a first vehicle, and sets an interference area based on the position information of the set vehicle.

The control unit 161 may set the vehicle most adjacent to the own vehicle among the vehicles traveling on a left or right lane of the own vehicle among the acquired objects based on the acquired position information of the objects, as a first vehicle on a left or right lane, and set an interference area on the left or right side based on the position information of the first set vehicle on the left or right lane.

Here, when the first vehicle on the left or right lane is set, only the vehicle on the left lane may be set as the first vehicle or only the vehicle on the right lane may be set as the first vehicle depending on the lane on which the own vehicle is located.

The control unit 161 acquires position information of at least one vehicle traveling around the own vehicle as two-dimensional plane coordinates, sets the vehicle most adjacent to the own vehicle among the vehicles as the first vehicle, acquires coordinates of the first set vehicle, and sets an area within a first fixed distance in a left direction from the coordinates of the first vehicle, a second fixed distance in a right direction, and a third fixed distance in a forward direction as an interference area.

Here, the first fixed distance and the second fixed distance may be the same as each other or may be different from each other.

The first vehicle may be a vehicle located in front of the own vehicle or may be a vehicle located to the left or right of the own vehicle.

The control unit 161 may set, as the interference area, an area having a preset size based on the position information of the first vehicle.

The control unit 161 receives the image signal detected by the image detection unit 130 and performs signal processing on the received image signal. For example, the control unit 161 changes a size and a format of the image signal in order to improve speed of signal processing and performs an image quality improvement task.

The control unit 161 performs a clearing process and a noise removal process on the image signal to generate image information, and applies vision technologies for separating objects from the image information, to extract the objects as results from the image information.

The control unit 161 detects the object based on the acquired image information, determines shape information of the detected object, and stores the shape information in the storage unit 162.

When determining the shape information of the object, the control unit 161 may classify the objects according to a size or a type thereof to determine the shape information of the object.

The control unit 161 may determine the shape of the object in the object recognition mode, may determine the shape of the object periodically, or may determine the shape of the object based on a command from the user.

When recognizing the object using the distance detection unit, the control unit 161 may also acquire image information of the object using the image detection unit, and correct the shape information and the position information of the object acquired by the distance detection unit based on the acquired image information of the object and the image information of the object stored in the storage unit 162.

That is, the control unit 161 may determine the image information matching the acquired image information of the object among the image information of the object stored in the storage unit 162, compare the determined image information with the acquired image information of the object, determine undetected image information in the acquired image information of the object, correct the shape information of the object acquired by the distance detection unit using the undetected image information, and correct the position information of the object acquired by the distance detection unit based on the corrected shape information.

Here, the undetected image information is image information of a portion covered by the preceding vehicle located adjacent to the own vehicle among the image information of vehicles some distance away.

With the shape information of the object acquired by the distance detection unit, a portion covered by the preceding vehicle located adjacent to the own vehicle cannot be acquired. Accordingly, the portion covered by the preceding vehicle is corrected based on the shape information of the object stored in the storage unit.

Thus, the control unit 161 may determine the image information of the object to recognize a type, size, and shape of the object.

In addition, the control unit 161 may correct only the shape information and the position information of the vehicle located in the interference area.

The control unit 161 may transfer information on the object in which the shape information and the position information of the vehicle have been corrected, to the electronic control unit 170.

The control unit 161 may extract the object from the image information, identify the size and the position of the object, calculate the position and a trajectory of the object, and determine whether the object is a bicycle, a pedestrian, or a signpost or recognize color of a traffic light.

This control unit 161 may be a CPU or an MCU or may be a processor.

These functions of the control unit 161 of the object recognition device may be included in the electronic control unit 170.

The storage unit 162 may store the shape information of the object determined by the control unit 161, and may further store type information and size information of the object.

Here, the shape information of the object is image information of the object. The shape information of the object may be image information of the vehicle.

In addition, the storage unit 162 may include shape information in which the size has been adjusted to correspond to the distance to the object.

The storage unit 162 can store an application program necessary for an operation of the object recognition function, and an application program necessary for the autonomous traveling mode.

The storage unit 162 may include not only a volatile memory such as an SRAM or a DRAM, but also a non-volatile memory such as a flash memory, a read only memory (ROM), an erasable programmable read only memory (EPROM), or an electrically erasable programmable read only memory (EEPROM).

In the object recognition mode, the electronic control unit (ECU) 170 controls driving of the driving device 180 and an output unit (not shown) based on the shape and position information of the object recognized by the object recognition device 160.

In the warning mode, the electronic control unit (ECU) 170 recognizes the lane, receives information on the recognized lane and information on the recognized object, determines whether or not there is an obstacle in the traveling lane, and determines that there is no obstacle on the traveling lane when there is no obstacle in the recognized lane.

In this case, control for warning may be unnecessary.

When the recognized obstacle is a pedestrian rather than a vehicle, the electronic control unit (ECU) 170 may determine that there is no obstacle on the traveling lane, but may perform control for warning. This is because the pedestrian may not move along the lane.

In this case, the output unit (not shown) may warn the driver, drivers of other vehicles, or the pedestrian in order to prevent collision between vehicles or between the vehicle and the pedestrian.

The output unit (not shown) may warn the driver of danger using audio, may warn the driver using visible light, or may warn the driver using a large number of other means such as vibration of the steering wheel or the seat when there is a risk of collision.

Further, the electronic control unit may control the brake device to avoid collision with other vehicles or pedestrians or may control the steering device to change a direction to the left or the right in order to prevent accidents.

The electronic control unit 170 may control autonomous traveling based on the position information and the shape information of the recognized object.

In the autonomous traveling mode, the electronic control unit 170 determines the destination information, searches for a path from a current position to the destination based on the determined destination information, and controls the driving device 180 based on the searched path.

In this case, the electronic control unit 170 may control driving of at least one of the power generation device which is the driving device 180, the power transfer device, the traveling device, the steering device, the brake device, the suspension device, the transmission, and the fuel device.

The communication unit 171 may include wired or wireless communication.

That is, the communication unit 171 may include a CAN communication module, a WIFI communication module, a USB communication module, a Bluetooth communication module, TPEG such DMB, and a broadcast communication module such as SXM or RDS.

The communication unit 171 may include a global positioning system (GPS) reception unit.

The GPS reception unit receives position information provided by a plurality of satellites, and acquires current position information of the vehicle.

Here, a GPS receiver includes an antenna that receives signals of the plurality of GPS satellites, software that acquires a position of the vehicle using distance and time information corresponding to position signals of the plurality of GPS satellites, and an output unit that outputs acquired current position information of the vehicle.

The communication unit 171 may also perform communication between various electronic devices inside the vehicle, communication with a vehicle terminal, and communication with the user terminal.

Figure 4:
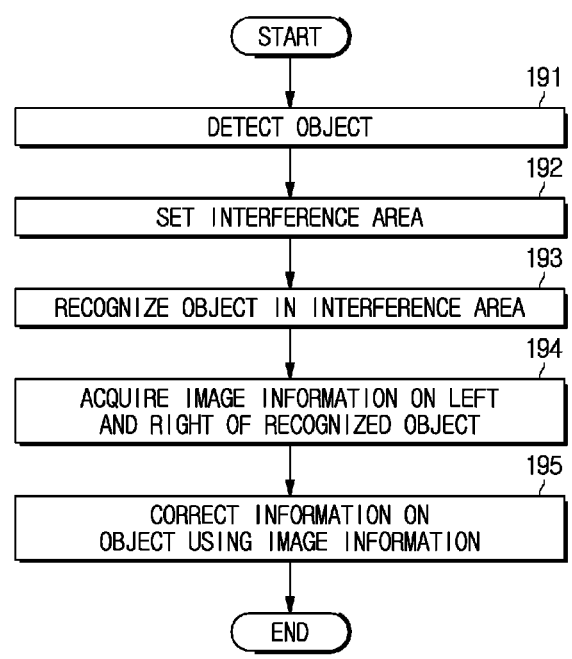
FIG. 4 is a flowchart for control of the vehicle according to embodiments of the present disclosure.

FIG. 4 is a flowchart for control of the vehicle according to embodiments of the present disclosure.

In the object recognition mode, the vehicle 1 activates the distance detection unit 120 and the image detection unit 130.

The vehicle 1 operates the distance detection unit 120 to scan the vicinity of the vehicle, that is, the front, left, and right sides. Here, the distance detection unit 120 may include at least one distance detection unit.

The vehicle 1 photographs surroundings thereof using the image detection unit to detect an image signal, and acquires image information from the detected image signal.

The vehicle 1 detects an object based on a signal of the reflected waves received by the distance detection unit 120 (191). This will be described with reference to FIGS. 5A to 9.

The signal of the reflected waves received by the distance detection unit 120 is a signal reflected by the object scanned by the LiDAR sensor which is the distance detection unit.

The signal of the reflected waves may be collected as point data of coordinates corresponding to a reflection direction and a reflection distance.

Figure 5A:
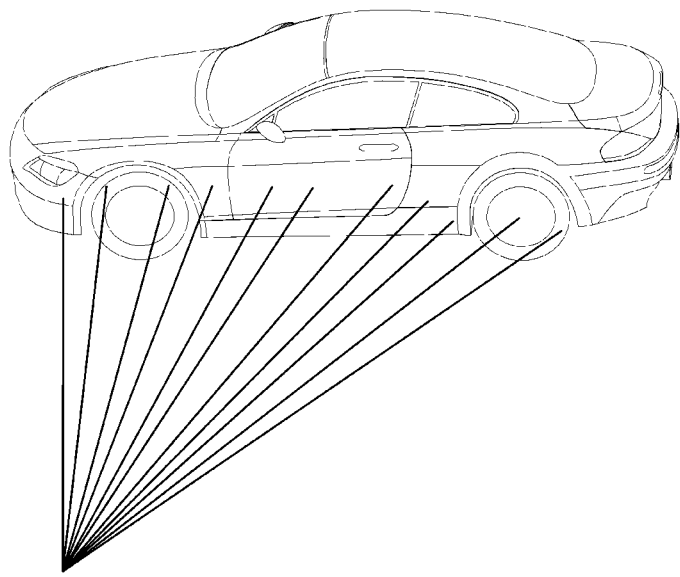
FIGS. 5A and 5B are diagrams illustrating object detection of the vehicle according to embodiments of the present disclosure.

As illustrated in FIG. 5A, the vehicle transmits the laser toward the front, left, and right directions of the vehicle. In this case, when there is an object in a transmission direction of the laser, the laser hits the object, and when there is no object, the laser goes straight in the transmission direction.

Figure 5B:
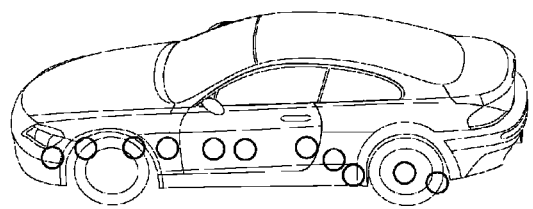

As illustrated in FIG. 5B, the vehicle receives signals of reflected waves reflected at positions corresponding to the transmission directions of the laser.

That is, the vehicle receives the reflected waves of the laser transmitted in each transmission direction, which are the reflected waves reflected by each surface of the object. In this case, the received reflected waves may be acquired as point data.

Figure 6:
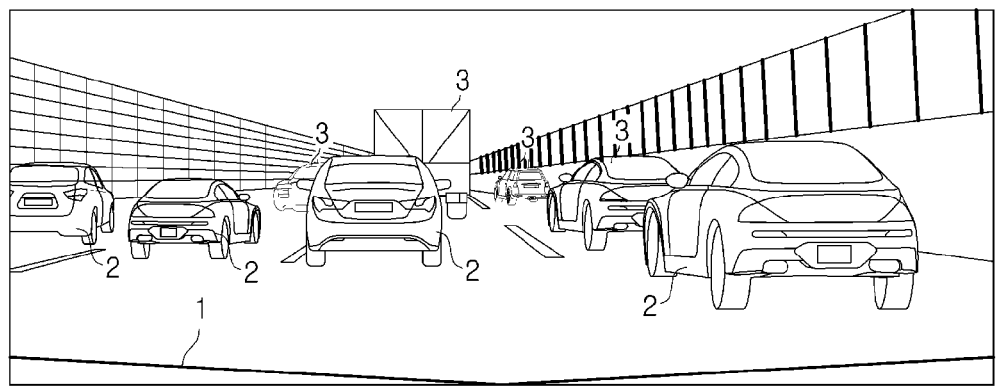
FIG. 6 is a diagram illustrating a situation of a road around the vehicle according to embodiments of the present disclosure.

It is assumed that the own vehicle 1 is located on a third lane of a one-way 4-lane road, and preceding vehicles are present on the same lane and right and left lanes, as illustrated in FIG. 6.

Here, the preceding vehicle refers to vehicles located in front of the own vehicle based on a position of the own vehicle.

In this case, the preceding vehicle on each lane located most adjacent to the own vehicle 1 among the preceding vehicles located on the respective lanes may be defined as a first vehicle 2, and a preceding vehicle of the first vehicle 2 adjacent to the first vehicle 2 may be defined as a second vehicle 3.

Figure 7:
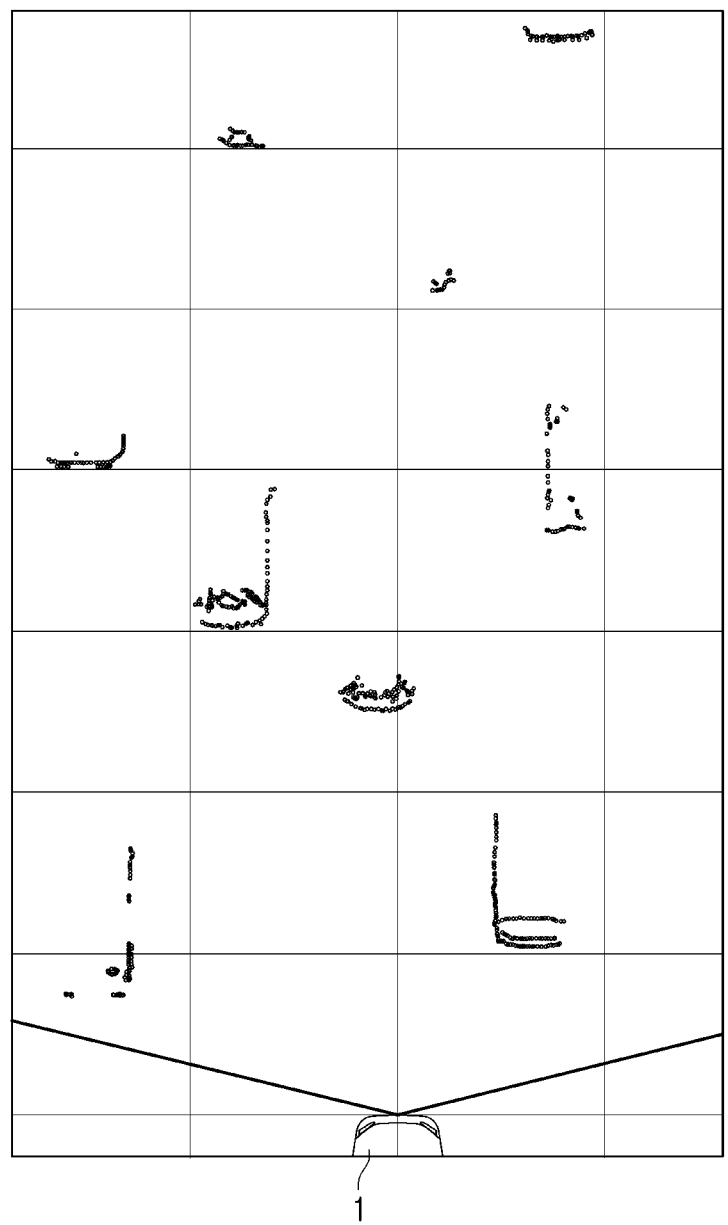
FIG. 7 is a diagram illustrating a case of coordinates of signals received by a distance detection unit of the vehicle according to embodiments of the present disclosure.

As illustrated in FIG. 7, when the vehicle 1 transmits a laser using the distance detection unit, the vehicle 1 may detect the signal of the reflected waves reflected by the preceding vehicles 2 and 3, and acquire point data at coordinates based on the detected signal.

Figure 8:
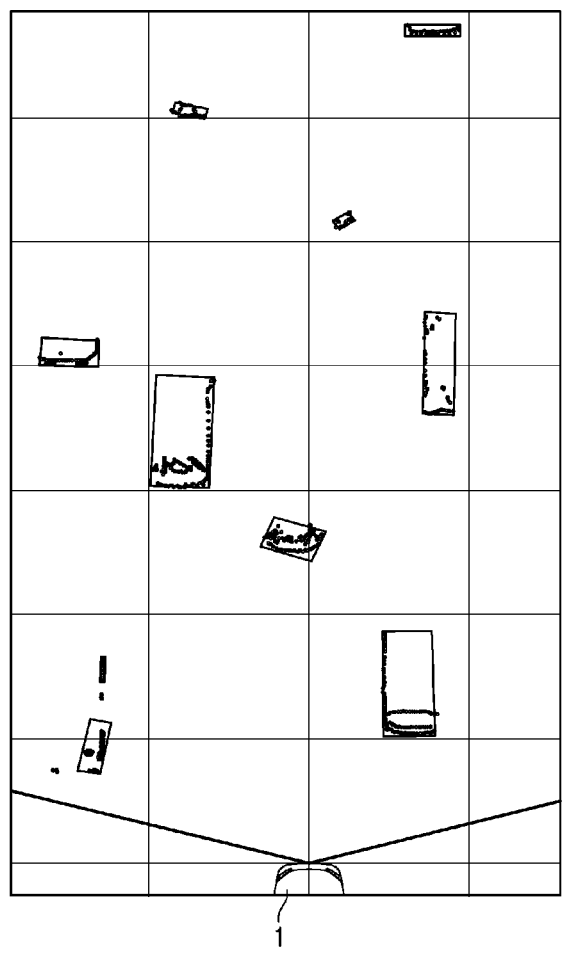
FIG. 8 is a diagram illustrating a case in which the signals received by the distance detection unit of the vehicle are grouped according to embodiments of the present disclosure.

As illustrated in FIG. 8, the vehicle 1 groups the point data at the coordinates to acquire shape information and position information of the object.

Here, grouping the point data includes connecting points adjacent to each other based on the direction, the distance, and the number of points between the own vehicle and the object.

Figure 9:
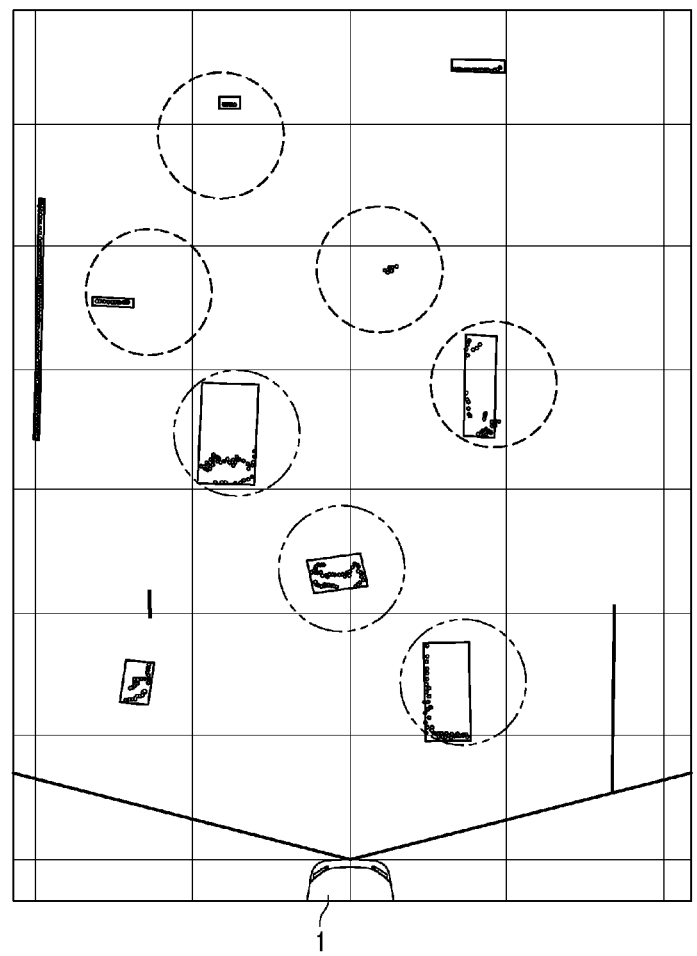
FIG. 9 is a diagram illustrating vehicles detected by the distance detection unit of the vehicle according to embodiments of the present disclosure.

As illustrated in FIG. 9, the vehicle 1 groups point data to acquire the shape information and the position information of a preceding vehicle located on each lane, sets, as the first vehicle 1, the preceding vehicle on each lane located most adjacent to the own vehicle among the preceding vehicles located in the respective lanes based on the acquired position information of the preceding vehicle, and sets the preceding vehicle of the first vehicle 2 adjacent to the first vehicle 2 as the second vehicle 3.

The vehicle 1 sets an interference area based on the acquired position information of the first set vehicle (192).

More specifically, the LiDAR sensor that is the distance detection unit transmits a laser having straightness, the shape and the position of the object are detected based on the signal of the reflected waves reflected by the object, and accordingly, when a portion of the second object (that is, the second vehicle) is covered by the first object (that is, the first vehicle) most adjacent to the LiDAR sensor, only reflected waves reflected by an exposed surface of the second object can be detected.

That is, since the LiDAR sensor cannot transmit the laser to the covered surface of the second object, the LiDAR sensor cannot receive the reflected waves.

Accordingly, the vehicle 1 cannot recognize the portion of the second object covered by the first object.

Thus, when the vehicle 1 recognizes the object in front of the vehicle 1 using the distance detection unit, the vehicle 1 determines whether there is the second object covered by the first object, and recognizes the covered portion of the second object when it is determined that there is the second object covered by the first object.

For this, the vehicle 1 sets an area covered by the first object in a field of vision of the LiDAR sensor that is the distance detection unit, that is, a disturbance area in which the first object interferes with the field of vision of the LiDAR sensor, and recognizes the second object in the set interference area (193).

This will be described with reference to FIGS. 10 to 13.

Figure 10:
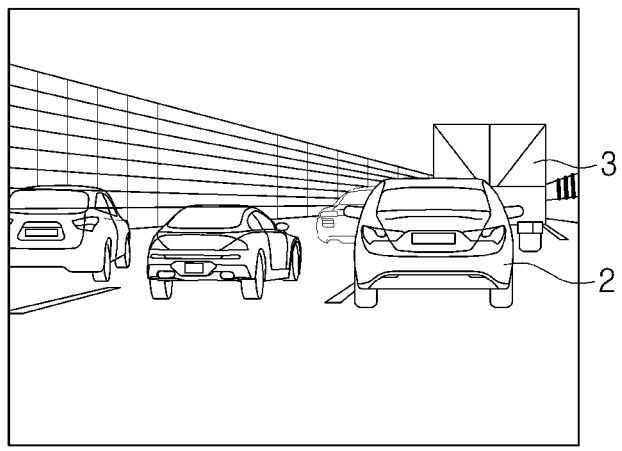
FIG. 10 is a diagram illustrating a case in which a first vehicle among vehicles is set according to embodiments of the present disclosure.

A process of setting the disturbance area when the preceding vehicle traveling on the same lane as the own vehicle 1 is set as the first vehicle 2 as illustrated in FIG. 10 will be described.

Figure 11:
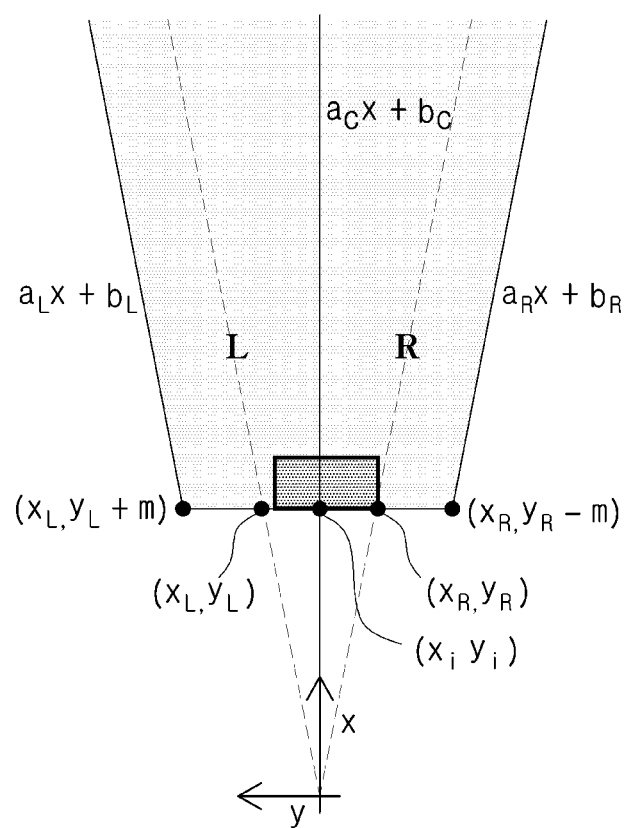
FIG. 11 is a diagram illustrating a case in which an interference area of the vehicle is set according to embodiments of the present disclosure.

As illustrated in FIG. 11, the vehicle 1 acquires (x, y) coordinates from a center of a coordinate system based on position information of the first vehicle 2.

The vehicle 1 may recognize shape information of the grouped first vehicles 2 to be a rectangular shape. In this case, coordinates of four corners of the rectangular shape may be obtained.

The vehicle 1 sets an area using left and right endpoints of the first vehicle 2.

That is, the vehicle 1 represents right and left boundary coordinates of the first vehicle as $(X_L, Y_L)$ and $(X_R, Y_R)$, respectively, and acquires boundary coordinates moved by a first fixed distance m in a left direction from the left boundary coordinates and moved by a second fixed distance m in a right direction from the right boundary coordinates based on the coordinates of the first vehicle in order to define a larger area since a portion of the vehicle over the disturbance area may protrude to the outside of the disturbance area.

That is, the vehicle 1 defines the boundary of the area using a straight line passing through points $(X_L, Y_L+m)$ and $(X_R, Y_R-m)$, Here, the first fixed distance and the second fixed distance may be the same as each other or may be different from each other.

The vehicle 1 also sets an area moved by a third fixed distance in a forward direction from the two points as the interference area.

Here, a straight line connecting a left point $(X_L, Y_L+m)$ may be indicated by $a_L X + b_L$, a straight line connecting a right point $(X_R, Y_R-m)$ may be indicated by $a_R X + b_R$, and a straight line passing through a center point $(X_i, Y_i)$ and dividing the area into the left and the right may be indicated by $a_c X + b_c$.

Here, the respective parameters are defined as follows.

$a_L = Y_L/X_L$, $b_L = m$, $a_R = Y_R/X_R$, $b_R = -m$, $a_c = Y_c/X_c$, and $b_c = X_i$ That is, the vehicle 1 sets an area surrounded by two left and right straight lines as the disturbance area.

The vehicle 1 also sets an area in which an X coordinate of the vehicle is greater than $X_L$ as a left interference area, and sets an area in which the X coordinate of the vehicle is greater than $X_R$ as a right interference area.

More specifically, if $a_L X + b_L > Y > a_c X + b_c$ and $X > X_L$, the vehicle sets the area as the left interference area, and if $a_c X + b_c > Y > a_R X + b_R$ and $X > X_R$, the vehicle sets the area as the right interference area.

Figure 12:
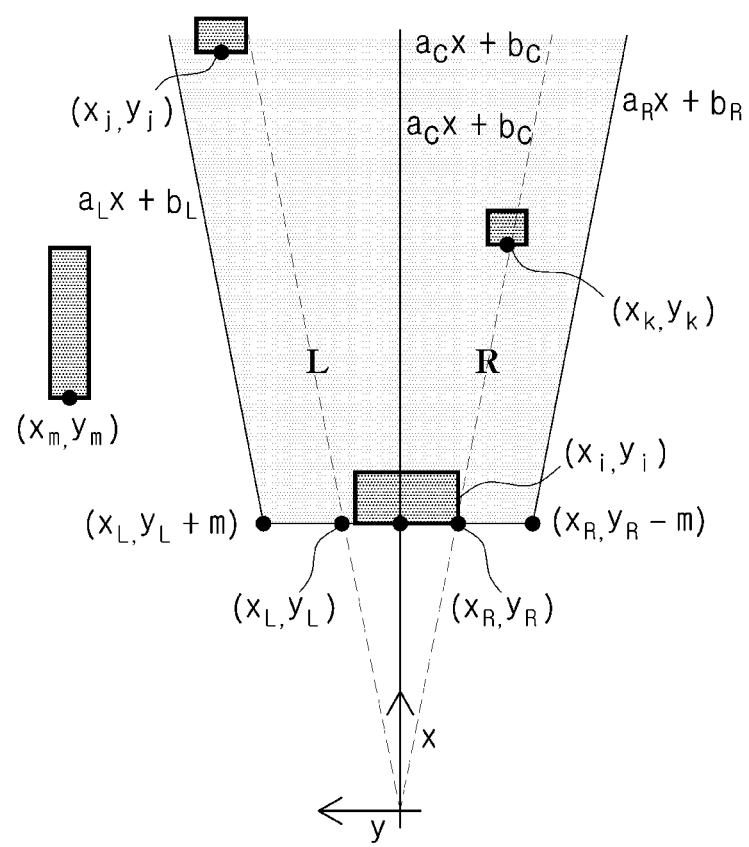
FIG. 12 is a diagram illustrating a case in which a second vehicle among vehicles is set according to embodiments of the present disclosure.

As illustrated in FIG. 12, the vehicle 1 acquires the coordinates $(X_j, Y_j)$ of the second vehicle 3, and determines the second vehicle is located in the left interference area or the right interference area based on the acquired coordinates $(X_j, Y_j)$ of the second vehicle.

The second vehicle 3 is determined to be located in the left interference area since $a_L X + b_L > Y_j > a_c X + b_c$ and $X_j > X_L$.

The vehicle 1 also acquires the coordinates $(X_K, Y_K)$ of the second vehicle 3, and determines the second vehicle is located in the left interference area or the right interference area based on the acquired coordinates $(X_K, Y_K)$ of the second vehicle.

The second vehicle 3 is determined to be located in the right interference area since $a_c X + b_c > Y_K > a_R X + b_R$ and $X_K > X_R$.

The vehicle 1 also acquires the coordinates $(X_M, Y_M)$ of the second vehicle 3, and determines the second vehicle is located in the left interference area or the right interference area based on the acquired coordinates $(X_M, Y_M)$ of the second vehicle, and determines that the second vehicle is not covered by the first vehicle when the second vehicle 3 is determined not to be located in the interference area.

That is, the vehicle 1 is determined to be a vehicle located in a sensing field of vision of the distance detection unit.

The vehicle 1 may set the first vehicle among the preceding vehicles traveling on the respective lanes through the process as described above, and set an interference area of each lane based on the position information of the first set vehicle.

Figure 13:
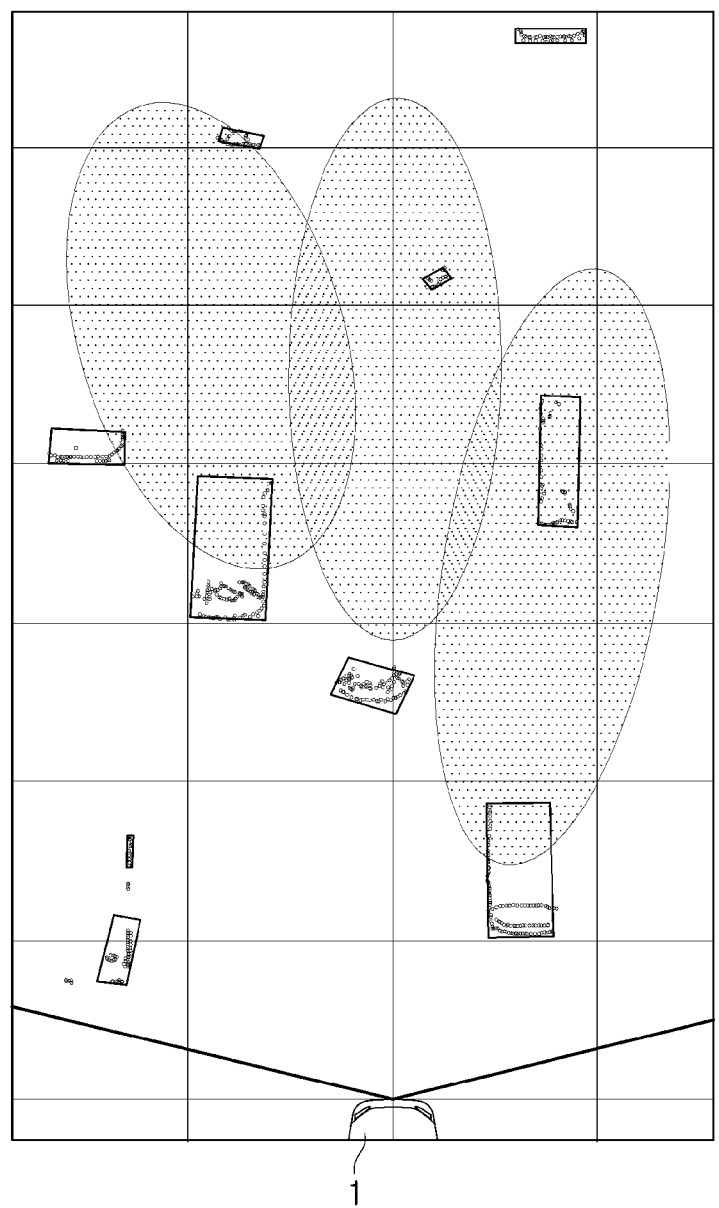
FIG. 13 is a diagram illustrating a case in which an interference area for a first vehicle among vehicles is set according to embodiments of the present disclosure.

As illustrated in FIG. 13, the vehicle 1 may set, as the first vehicle 2, the preceding vehicle on each lane most adjacent to the own vehicle 1 among the preceding vehicles located on the respective lanes, and set the interference area of each lane based on the position information of the first vehicle 1 on each lane.

Further, when the first vehicle on the left or right lane is set, only the vehicle on the left lane may be set as the first vehicle or only the vehicle on the right lane may be set as the first vehicle depending on the lane on which the own vehicle is located.

Then, the vehicle 1 corrects the information on the second vehicle located in the interference area, which is information on the second vehicle detected by the distance detection unit.

Here, the second vehicle is a vehicle located before the first vehicle based on the position of the own vehicle.

More specifically, the vehicle 1 acquires image information of the second vehicle located in the interference area, determines the image information matching the acquired image information of the second vehicle among the image information of the vehicle stored in the storage unit 162, compares the determined image information with the acquired image information of the second vehicle, and determines undetected image information in the acquired image information of the second vehicle.

In this case, the vehicle 1 can determine whether a right side or a left side of the second vehicle is covered by the first vehicle.

Here, determining the undetected image information of the second vehicle includes acquiring image information of a portion not detected by the distance detection unit.

In this case, the vehicle 1 may acquire image information of a portion covered by the first vehicle, that is, the left side or the right side of the second vehicle (194).

The vehicle 1 corrects the shape information of the second vehicle acquired by the distance detection unit using the determined undetected image information. In this case, the vehicle 1 corrects a portion not acquired by the distance detection unit (195).

The vehicle 1 corrects left and right position information of the second vehicle acquired by the distance detection unit based on the corrected shape information.

Figure 14:
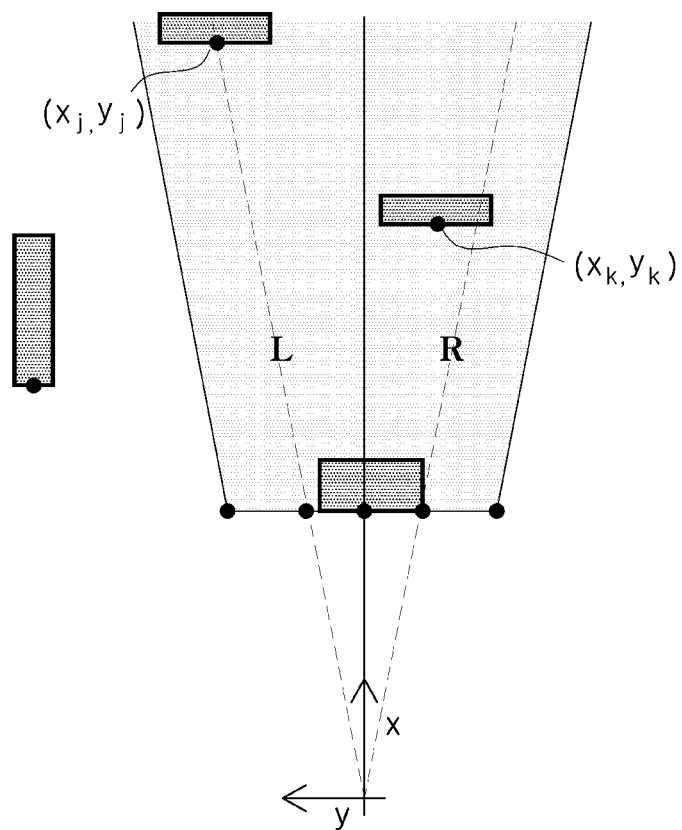
FIG. 14 is a diagram illustrating correction of information of the second vehicle among the vehicles according to embodiments of the present disclosure.

As illustrated in FIG. 14, the vehicle 1 may determine the second vehicle of which only the left side or the right side is recognized among the second vehicles located in the interference area interfering with the field of vision, based on the pre-stored image information and the acquired image information, and correct the shape information of the opposite side of the second vehicle to recognize the shape and the position of the second vehicle more accurately.

In addition, the vehicle may adjust the size of the undetected image information of the second vehicle based on the distance to the second vehicle, and correct the size information of the second vehicle acquired by the distance detection unit based on the adjusted size.

The vehicle 1 may determine whether an undetected portion of the second vehicle is a left portion or a right portion based on the position information of the first vehicle and the position information of the second vehicle, and compensate for the shape of the determined portion.

For example, the vehicle 1 may correct the right shape of the second vehicle by a preset size when the vehicle 1 determines that the second vehicle is located in the left interference area, and correct the left shape of the second vehicle by a preset size when the vehicle 1 determines that the second vehicle is located in the right disturbance area.

The vehicle performs determining using the acquired image information while recognizing the object in this way, and stores the shape information of the determined object in the storage unit 162. Thus, when determining the shape information of objects, it is possible to classify the objects according to the size and the type of the objects and determine the object.

DESCRIPTION OF REFERENCE NUMBERS

1: own vehicle
2: first vehicle
3: second vehicle
120: distance detection unit
130: image detection unit
148: input unit
160: object recognition device

What is claimed is:

1. An object recognition device comprising:
a storage unit that stores image information corresponding to respective shapes of a plurality of objects; and
a control unit that groups a plurality of signals detected by a distance detection unit to acquire position information of at least one of the plurality of objects, sets a first object of the plurality of objects based on the acquired position information, sets an interference area based on position information of the first object, acquires position information and image information of a second object of the plurality of objects located in the interference area, and corrects the acquired position information of the second object based on the image information of the second object and the image information stored in the storage unit.

2. The object recognition device according to claim 1, wherein the control unit acquires image information of the at least one object based on an image signal detected by an image detection unit, determines the shape of the at least one object based on the acquired image information, and controls storage of image information of the at least one object.

3. The object recognition device according to claim 1, wherein the control unit groups the plurality of signals to acquire shape information of the second object, and corrects the acquired shape information of the second object based on the image information of the second object and the image information stored in the storage unit.

4. A vehicle comprising:
a body;
a distance detection unit that is provided in the body and detects a distance from the vehicle to a surrounding object;
an image detection unit that is provided in the body and detects an image of the surrounding object;
a storage unit that stores image information corresponding to respective shapes of a plurality of objects; and
an object recognition device that groups a plurality of signals detected by the distance detection unit to acquire position information of at least one of the plurality of objects, sets a vehicle closest to the body as a first vehicle based on the acquired position information, sets an interference area based on position information of the first vehicle, acquires position information and image information of a second vehicle located in the interference area, and corrects the acquired position information of the second vehicle based on the image information of the second vehicle and the image information stored in the storage unit.

5. The vehicle according to claim 4, wherein the object recognition device acquires image information of the at least one object based on an image signal detected by an image detection unit, determines the shape of the at least one object based on the acquired image information, and controls storage of image information of the at least one object.

6. The vehicle according to claim 4, wherein the object recognition device acquires shape information of the second vehicle based on a grouping of the plurality of signals and corrects the acquired shape information of the second object based on the image information of the second vehicle and the image information stored in the storage unit.

7. The vehicle according to claim 6, wherein the object recognition device determines image information matching the image information of the second vehicle among the image information stored in the storage unit, acquires image information of an undetected portion not detected by the distance detection unit based on the determined image information, and corrects the shape information of the second vehicle based on the acquired image information of the undetected portion.

8. The vehicle according to claim 6, further comprising:
an electronic control unit that controls driving of a driving device of the vehicle based on the shape information and the position information of the first vehicle and the corrected position information and the corrected shape information of the second vehicle in an autonomous traveling mode.

9. The vehicle according to claim 8, further comprising:
a communication unit that receives a current position of the vehicle,
wherein the electronic control unit controls driving of the driving device based on the current position.

10. The vehicle according to claim 4, wherein the object recognition device sets a preceding vehicle traveling in the same lane as the vehicle and located closest to the vehicle as the first vehicle.

11. The vehicle according to claim 4, wherein the object recognition device sets a preceding vehicle traveling in a lane to the left or right of a lane in which the vehicle is located and located closest to the vehicle as the first vehicle.

12. The vehicle according to claim 4, wherein the distance detection unit includes at least one LiDAR sensor, and the image detection unit includes at least one image sensor.

13. The vehicle according to claim 4, wherein the object recognition device sets, as the interference area, an area within a first fixed distance to the left from a left end point in the position information of the first vehicle, a second fixed distance to the right from a right end point, and a third fixed distance forward from left and right endpoints.

14. The vehicle according to claim 4, wherein the object recognition device sets an area having a preset size as the interference area based on the position information of the first vehicle.

15. A vehicle comprising:
a body;
a distance detection unit that is provided in the body and detects a distance from the vehicle to a surrounding object;
an image detection unit that is provided in the body and detects an image of the surrounding object;
a storage unit that stores image information corresponding to respective shapes of a plurality of objects; and
an object recognition device that groups a plurality of signals detected by the distance detection unit to acquire shape information and position information of at least one of the plurality of objects and corrects the acquired shape information and the acquired position information based on image information of the at least one object and the image information stored in the storage unit.

16. The vehicle according to claim 15, wherein the object recognition device determines the shape of the at least one object based on the image information of the at least one object and controls storage of the image information of the at least one object.

17. The vehicle according to claim 15, wherein the distance detection unit includes at least one LiDAR sensor, and the image detection unit includes at least one image sensor.

18. The vehicle according to claim 17, wherein the object recognition device determines the object located closest to the distance detection unit and corrects information of the object located in an interference area having a preset size based on the determined object.

19. The vehicle according to claim 18, wherein the object recognition device determines image information matching the image information of the object in the interference area among the image information stored in the storage unit, acquires image information of an undetected portion not detected by the distance detection unit based on the determined image information, and corrects shape information and position information of the object in the interference area based on the acquired image information of the undetected portion.

20. A method of controlling a vehicle, comprising:
detecting a distance from the vehicle to a surrounding object using a distance detection unit provided in a body of the vehicle;
grouping a plurality of signals detected by the distance detection unit to acquire position information of at least one object;
setting the vehicle closest to the vehicle as a first vehicle based on the acquired position information of the at least one object;

setting an interference area based on position information of the first vehicle;

acquiring position information and image information of a second vehicle located in the interference area;

correcting the acquired position information of the second vehicle based on the image information of the second vehicle and image information stored in a storage unit; and controlling driving of the vehicle based on the corrected position information of the second vehicle.

21. The method of controlling a vehicle according to claim 20, further comprising:

detecting an image signal of surroundings of the vehicle using an image detection unit;

acquiring image information of the at least one object based on the image signal;

determining a shape of the at least one object based on the acquired image information; and storing the image information of the at least one object.

22. The method of controlling a vehicle according to claim 20, further comprising:

acquiring shape information of the second vehicle based on a grouping of the plurality of signals, and correcting the acquired shape information of the second vehicle based on the image information of the second vehicle and the image information stored in the storage unit.

23. The method of controlling a vehicle according to claim 22, wherein the correcting of the shape of the second vehicle comprises:

determining image information matching the image information of the second vehicle among the image information stored in the storage unit;

acquiring image information of an undetected portion not detected by the distance detection unit based on the determined image information; and correcting the shape information of the second vehicle based on the acquired image information of the undetected portion.

24. The method of controlling a vehicle according to claim 20, wherein the first vehicle precedes the vehicle and travels in a lane located closest to the vehicle.

25. The method of controlling a vehicle according to claim 20, wherein the setting of the interference area comprises:

setting, as an interference area, an area within a first fixed distance to the left from a left end point in the position information of the first vehicle, a second fixed distance to the right from a right end point, and a third fixed distance forward from left and right endpoints.

* * * * *